United States Patent
Kawamoto et al.

(10) Patent No.: US 8,249,633 B2
(45) Date of Patent: Aug. 21, 2012

(54) RADIO COMMUNICATION SYSTEM, RADIO COMMUNICATION METHOD AND BASE STATION

(75) Inventors: Junichiro Kawamoto, Tokyo (JP); Akihito Hanaki, Yokohama (JP); Takahiro Hayashi, Yokosuka (JP); Yoshikazu Goto, Yokohama (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 719 days.

(21) Appl. No.: 12/326,211

(22) Filed: Dec. 2, 2008

(65) Prior Publication Data

US 2009/0147745 A1 Jun. 11, 2009

(30) Foreign Application Priority Data

Dec. 7, 2007 (JP) ................ P2007-316849

(51) Int. Cl.
*H04B 7/00* (2006.01)
(52) U.S. Cl. ........ 455/509; 455/522; 455/561; 370/328; 370/329; 370/345
(58) Field of Classification Search .......... 455/509, 455/522, 561; 370/328, 329, 345
See application file for complete search history.

(56) References Cited

U.S. PATENT DOCUMENTS

2009/0170513 A1* 7/2009 Ishii et al. .................. 455/435.1
2009/0253452 A1* 10/2009 Kato ............................. 455/509

FOREIGN PATENT DOCUMENTS

EP  1 845 637 A1  10/2007
EP  2 094 041 A2  8/2009

OTHER PUBLICATIONS

3GPP TS 25.321 V7.5.0 (Jun. 2007), 3rd Generation Partnership Project; Technical Specification Group Radio Access Network; Medium Access Control (MAC) protocol specification (Release 7), 141 pages.
Jung A. Lee et al.;"A Rate Control Algorithm for Uplink High-Speed Packet Data Transmission in UMTS"; Lucent Technologies, Bell Labs Innovations; pp. 730-734 (2005).
Infineon; "Considerations on E-TFC selection principles"; 3GPP TSG-RAN WG2 Meeting #45; Tdoc R2-042447; 2 sheets; (2004).
"Universal Mobile Telecommunications system (UMTS); Medium Access Control (MAC) protocol specification"; 3GPP TS 25.321; Version 7.6.0, Release 7; pp. 1-150 with cover page (2007).
Extended European search report issued on Aug. 1, 2011 in the counterpart European patent application, 10 sheets.

* cited by examiner

*Primary Examiner* — John Poos
(74) *Attorney, Agent, or Firm* — Marvin A. Motsenbocker; Mots Law, PLLC

(57) ABSTRACT

A base station 100 includes: a specifying unit 125 configured to specify a decrease target TTI that indicates the TTI in which a sum of already assigned transmission rates is larger than an allowable receiving transmission rate; a selecting unit 126 configured to select, as a decrease target radio terminal, the radio terminal to which the TTI in the decrease TTI is assigned; and a scheduling unit 120a configured to transmit, to the decrease target radio terminal, transmission rate decrease data that is the transmission rate control data (AG or RG) for instructing a decrease of the transmission rate.

8 Claims, 7 Drawing Sheets

RADIO COMMUNICATION SYSTEM, RADIO COMMUNICATION METHOD AND BASE STATION

BACKGROUND OF THE INVENTION

1. Field of the Invention

The present invention relates to a radio communication system, a radio communication method, and a base station, in which a radio terminal transmits uplink user data to a base station via an enhanced dedicated physical data channel and the base station transmits transmission rate control data for controlling a transmission rate of the uplink user data to the radio terminal.

2. Description of the Related Art

Heretofore, a radio communication system including a base station and a radio network controller has been known. In the radio communication system, the base station has a single or multiple cells, and a radio communication is performed between each of the cells and a plurality of radio terminals. The radio network controller controls a plurality of base stations, and assigns a radio resource to the plurality of the radio terminals. Note that such a technique (hereinafter referred to as first technique) is sometimes referred to as R99 (Release 99) or the like.

For the purpose of improving the throughput and shortening the delay time, and the like, there has recently been proposed a technique in which a base station assigns the radio resources for uplink user data transmitted from each of the radio terminals to the base station (network side). Note that such a technique (hereinafter referred to as a second technique) is sometimes referred to as the high speed uplink packet access (HSUPA), the enhanced uplink (EUL) or the like.

Each of the cells functions as a serving cell or as a non-serving cell. A transport block size (TBS) is determined based on the transmission rate (for example, a scheduling grant (SG)) of the uplink user data, and is controlled by transmission rate control data transmitted from the serving cell and the non-serving cell. The transmission rate control data includes an absolute grant (AG) for controlling an absolute value of the transmission rate and a relative grant (RG) for controlling a relative value of the transmission rate (for example, see 3GPP TS25.321 Ver. 7.5.0).

Here, the uplink user data is transmitted to the base station from the radio terminals via an enhanced dedicated physical data channel (E-DPDCH). The absolute grant (AG) is transmitted from the radio base station to the radio terminals via an E-DCH absolute grant channel (E-AGCH). The relative grant (RG) is transmitted from the radio base station to the radio terminals via an E-DCH relative grant channel (E-RGCH).

The serving cell transmits the absolute grant (AG) and the relative grant (RG) to the radio terminals. Meanwhile, the non-serving cell transmits, to the radio terminals, only the relative grant (RG) without transmitting the absolute grant (AG).

Meanwhile, the base station has an upper limit of radio resources (maximum radio resource) that can be assigned to the radio terminal. Here, the maximum radio resource is referred to as the sum of the transmission rates (maximum receiving transmission rate) that can be assigned to the radio terminal by the base station.

In the second technique described above, the base station can transmit the absolute grant (AG) or the relative grant (RG) in each transmission time interval (TTI). In other words, the transmission rate assigned to the radio terminal can be changed in each TTI.

Here, in a case where the sum of the transmission rates already assigned to the radio terminals in a certain TTI is larger than the maximum receiving transmission rate, a reception quality of uplink user data is deteriorated when the base station receives the uplink user data in the certain TTI.

Meanwhile, even when the sum of the transmission rates already assigned to the radio terminals in a certain TTI is larger than the maximum receiving transmission rate, the sum of the transmission rates already assigned to the radio terminals in a different TTI is not necessarily larger than the maximum receiving transmission rate.

Under the circumstances as described above, when the transmission rate to be assigned to the radio terminal is controlled in consideration of only one TTI in which the transmission rate already assigned to the radio terminal is larger than the maximum receiving transmission rate, radio resources (transmission rate) may not be efficiently assigned to the radio terminal in other TTIs.

SUMMARY OF THE INVENTION

A first aspect of the present invention is summarized as a radio communication system in which a radio terminal transmits uplink user data to a base station via an enhanced dedicated physical data channel in a transmission time interval assigned to the radio terminal, and in which the base station transmits, to the radio terminal, transmission rate control data for controlling a transmission rate of the uplink user data. The base station includes: a specifying unit (specifying unit 125) configured to specify a decrease target transmission time interval that indicates the transmission time interval in which a sum of already assigned transmission rates is larger than an allowable receiving transmission rate; a selecting unit (selecting unit 126) configured to select, as a decrease target radio terminal, the radio terminal to which the transmission time interval in the decrease target transmission time interval is assigned; and a transmitting unit (communication unit 110 and scheduling unit 120a) configured to transmit, to the decrease target radio terminal, transmission rate decrease data that is the transmission rate control data for instructing a decrease of the transmission rate. The allowable receiving transmission rate is not larger than a maximum receiving transmission rate that can be assigned by the base station.

According to the first aspect of the present invention, the specifying unit specifies the decrease target transmission time interval in which the sum of the already assigned transmission rates is larger than the allowable receiving transmission rate. Moreover, the transmitting unit transmits the transmission rate decrease data (AG or RG) to the decrease target radio terminal assigned the transmission time interval in the decrease target transmission time interval.

Specifically, in the transmission time interval in which a decrease of the assigned transmission rate is required, the transmission rate decrease data is transmitted. On the other hand, in the transmission time interval in which a decrease of the assigned transmission rate is not required, the transmission rate decrease data is not transmitted.

Therefore, the reception quality of the uplink user data can be prevented from being deteriorated and the radio resources (transmission rate) to be assigned to the radio terminal can be effectively utilized.

In the first aspect of the present invention, the base station transmits, to the radio terminal, as the transmission rate control data, an absolute transmission rate control data for directly specifying the transmission rate. The transmitting unit transmits, to the decrease target radio terminal, as the transmission rate decrease data, the absolute transmission rate control data for specifying a minimum transmission rate that indicates a minimum transmission rate to be assigned to the radio terminal.

In the first aspect of the present invention, the base station transmits, to the radio terminal, as the transmission rate control data, an absolute transmission rate control data for directly specifying the transmission rate. Further, the transmitting unit transmits, to the decrease target radio terminal, as the transmission rate decrease data, the absolute transmission rate control data for instructing the decrease target radio terminal to suspend using the transmission time interval in the decrease target transmission time interval.

In the first aspect of the present invention, the selecting unit preferentially selects, as the decrease target radio terminal, the radio terminal having a high transmission rate.

In the first aspect of the present invention, a predetermined number of transmission time intervals forms a cyclic period and the cyclic period is repeated. Further, the selecting unit preferentially selects, as the decrease target radio terminal, the radio terminal to which the large number of the transmission time intervals are assigned in the cyclic period.

In the first aspect of the present invention, the radio terminal has a priority class that is previously assigned. Further, the selecting unit preferentially selects, as the decrease target radio terminal, the radio terminal having a low priority class.

A second aspect of the present invention is summarized as a radio communication method in which a radio terminal transmits uplink user data to a base station via an enhanced dedicated physical data channel in a transmission time interval assigned to the radio terminal, and in which the base station transmits, to the radio terminal, transmission rate control data for controlling a transmission rate of the uplink user data. The method includes: specifying, at the base station, a decrease target transmission time interval that indicates the transmission time interval in which a sum of already assigned transmission rates is larger than an allowable receiving transmission rate; selecting, at the base station, as a decrease target radio terminal, the radio terminal to which the transmission time interval in the decrease target transmission time interval is assigned; and transmitting, from the base station to the decrease target radio terminal, transmission rate decrease data that is the transmission rate control data for instructing a decrease of the transmission rate. The allowable receiving transmission rate is not larger than a maximum receiving transmission rate that can be assigned by the base station.

A third aspect of the present invention is summarized as a base station configured to receive uplink user data from a radio terminal via an enhanced dedicated physical data channel, at a transmission time interval assigned to the radio terminal, and to transmit, to the radio terminal, transmission rate control data for controlling a transmission rate of the uplink user data. The base station includes: a specifying unit configured to specify a decrease target transmission time interval that indicates the transmission time interval in which a sum of already assigned transmission rate is larger than an allowable receiving transmission rate; a selecting unit configured to select, as a decrease target radio terminal, the radio terminal to which the transmission time interval in the decrease target transmission time interval is assigned; and a transmitting unit configured to transmit, to the decrease target radio terminal, transmission rate decrease data that is the transmission rate control data for instructing a decrease of the transmission rate. The allowable receiving transmission rate is not larger than a maximum receiving transmission rate that can be assigned by the base station.

DESCRIPTION OF THE EMBODIMENTS

Figure 1:
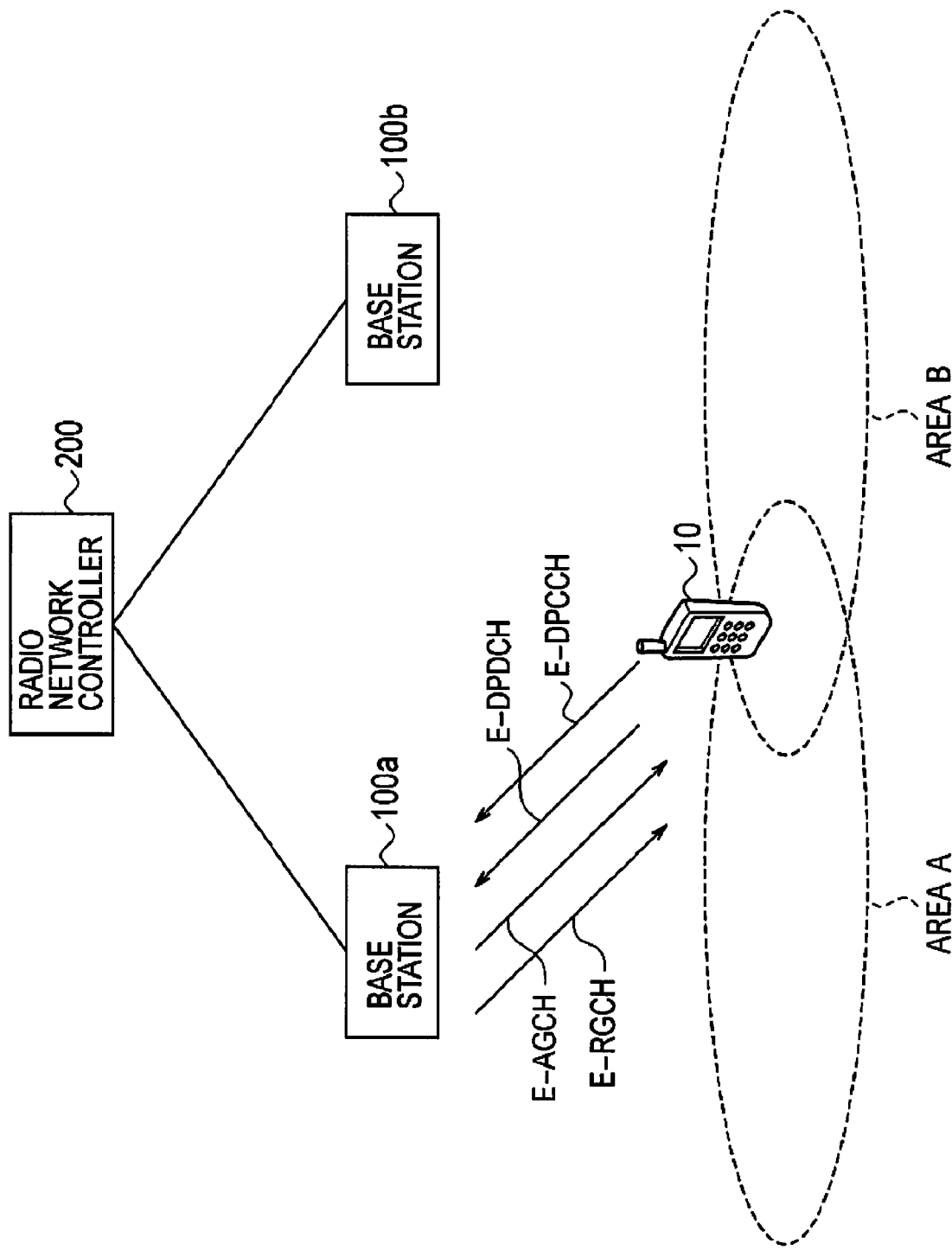
FIG. 1 is a view showing a radio communication system according to a first embodiment.

With reference to the drawings, a radio communication system according to an embodiment of the present invention will be described below. Note that, in the following description of the drawings, the same or similar parts will be denoted by the same or similar reference numerals.

However, it should be noted that the drawings are schematic and ratios of dimensions and the like are different from actual ones. Therefore, specific dimensions and the like should be determined by taking into consideration the following description. Moreover, as a matter of course, also among the drawings, there are included portions in which dimensional relationships and ratios are different from each other.

First Embodiment (Configuration of Radio Communication System)

With reference to the accompanying drawings, a configuration of a radio communication system according to a first embodiment will be described below. FIG. 1 is a view showing the radio communication system according to the first embodiment. As shown in FIG. 1, the radio communication system includes a radio terminal 10, a base station 100 (a base station 100a and a base station 100b), and a radio network controller 200.

The radio terminal 10 transmits uplink user data to the base station 100a. Specifically, the radio terminal 10 transmits the uplink user data to the base station 100 via a dedicated physical data channel (DPDCH) in a framework in which the radio network controller 200 assigns radio resources and the like. Note that such framework is sometimes referred to as R99 (Release 99) or the like.

In this framework, the radio terminal 10 transmits uplink control data to the base station 100a via a dedicated physical control channel (DPCCH).

Note that a transmission power of the DPCCH is controlled by a TPC command received from the base station 100, as in the case of general closed loop power controls. The TPC command is referred to a command generated by the base station 100, based on a comparison between a reception quality of an uplink signal and a target quality.

Meanwhile, the radio terminal 10 transmits uplink user data to the base station 100a via an enhanced dedicated physical data channel (E-DPDCH), in a framework in which the base station 100 assigns radio resources and the like. Note that this framework is sometimes referred to as the high speed uplink packet access (HSUPA), the enhanced uplink (EUL) or the like.

Here, the uplink user data is divided into blocks for each transmission time interval (TTI), that is, for each process (HARQ process). Each of the blocks (MAC-e PDU) is transmitted by use of a process (hereinafter referred to as an active process) assigned to the radio terminal 10.

Moreover, a predetermined number of processes (process #1 to process #n) forms a cyclic period (HARQ RTT), and the cyclic period is repeated. Note that the number of processes included in the cyclic period is determined according to a TTI length. For example, when the TTI length is 2 ms, the number of processes included in the cyclic period is "8". When the TTI length is 10 ms, the number of processes included in the cyclic period is "4".

Here, the radio terminal 10 has a table associating a transmission power ratio with the transmission rate. This table is used for transmitting the uplink user data via the E-DPDCH. The transmission power ratio is a ratio of a transmission power of the E-DPDCH to a transmission power of the DPCCH (E-DPDCH/DPCCH). The transmission rate is represented by a transport block size (TBS).

The transmission power ratio assigned to the radio terminal 10 will be hereinafter referred to as a scheduling grant (SG). Note that the transmission power ratio and the transmission rate are associated one-to-one with each other. Thus, the scheduling grant (SG) may be considered not only as a term representing the transmission power ratio assigned to the radio terminal 10 but also as a term representing the transmission rate assigned to the radio terminal 10.

Note that, as described later, the radio terminal 10 updates the SG according to transmission rate control data (AG or RG) received from the base station 100a (see 3GPP TS25.321 Ver. 7.5.0 11.8.1.3 "Scheduling grant Update"). Subsequently, the radio terminal 10 determines a transmission rate (that is, TBS) corresponding to the SG by referring to the table associating the transmission power ratio with the transmission rate (see 3GPP TS25.321 Ver. 7.5.0 11.8.1.4 "E-TFC Selection").

In a framework in which the base station 100 assigns the radio resources and the like, the radio terminal 10 transmits uplink control data to the base station 100a via the enhanced dedicated physical control channel (E-DPCCH) or the like. The uplink control data includes UL scheduling information and the like, which is referred to by the base station 100a when the base station 100a assigns the radio resources.

The UL scheduling information includes "HLID (Highest priority Logical Channel ID)", "TEBS (Total E-DCH Buffer Status)", "HLBS (Highest priority Logical Channel Buffer Status)", "UPH (User Power Headroom)" and the like (see 3GPP TS25.321 Ver. 7.5.0 9.2.5.3.2 "Scheduling Information").

"HLID" is an identifier for identifying the highest priority logical channel among logical channels transmitting the uplink user data.

"TEBS" is buffer information indicating a total amount (buffer amount) of the uplink user data stored in a transmission buffer provided in the radio terminal 10.

"HLBS" is a total amount (buffer amount) of uplink user data to be transmitted by the logical channel identified by the HLID, among the uplink user data stored in the transmission buffer provided in the radio terminal 10.

"UPH" is a transmission power ratio that is a ratio of a maximum UE transmission power to a transmission power of the DPCCH. The maximum UE transmission power is a maximum transmission power that can be used by the radio terminal 10. For example, the UPH is represented by "maximum UE transmission power" "transmission power of DPCCH".

"Happy Bit" is information indicating whether or not the SG assigned to the radio terminal 10 is sufficient. The kinds of "Happy Bit" include "Happy" indicating that the SG assigned to the radio terminal itself is sufficient and "Unhappy" indicating that the SG assigned to the own terminal is insufficient. Note that "Happy Bit" is expressed by 1 bit.

Note that the radio terminal 10 may transmit "Happy Bit" to the base station 100 at the timing different from that of the scheduling information including the various information ("HLID", "TEBS", "HLBS" and "UPH") described above.

Figure 2:
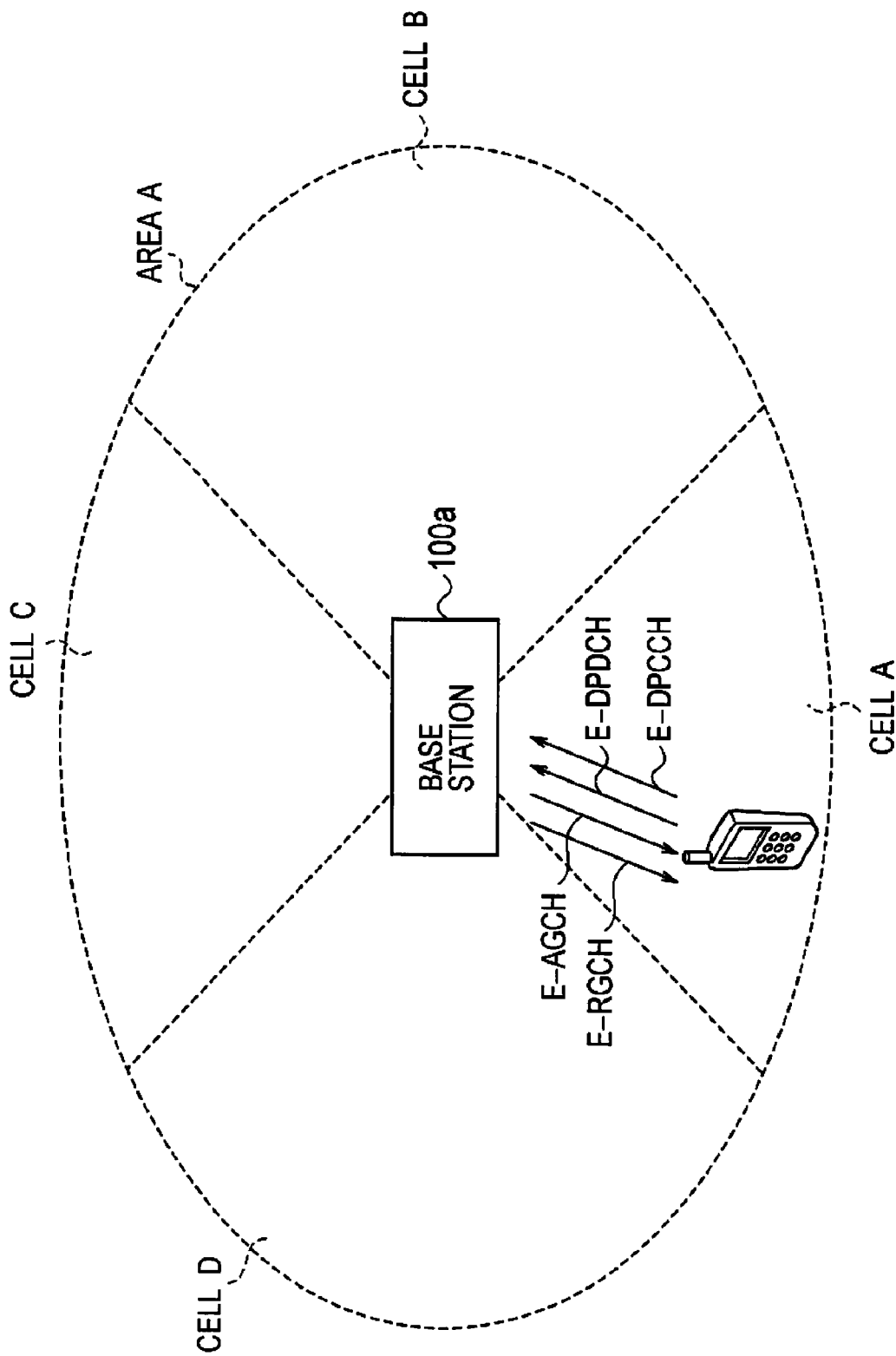
FIG. 2 is a view showing the radio communication system according to the first embodiment.

As shown in FIG. 2, the base station 100a controls a plurality of cells (cells A to D), and each of the plurality of cells communicates with the radio terminal 10 located in the each of the plurality of cells. Each of the cells can function as a serving cell, or a non-serving cell.

Note that the "cell" is basically used as a term representing a function communicating with the radio terminal 10. The "cell" is sometimes used as a term representing an area within which the radio terminal 10 is located.

For example, in FIG. 2, the radio terminal 10a performs a communication according to an instruction from an EUL scheduler provided in the cell A (in other words, the radio terminal performs a communication according to an AG received from the cell A via E-AGCH). In this example, the cell A is a serving cell for the radio terminal 10a and the cells B to D are non-serving cells for the radio terminal 10a. Meanwhile, the radio terminal 10a is referred to as a serving terminal for the cell A and as a non-serving terminal for the cells B to D.

The base station 100a receives the uplink user data from the radio terminal 10 via the data channel such as the DPDCH or the E-DPDCH. Meanwhile, the base station 100a transmits, to the radio terminal 10, transmission rate control data for controlling a transmission rate of the uplink user data to be transmitted via the E-DPDCH. Note that the transmission rate control data includes an absolute grant (AG) for controlling an absolute value of the transmission rate, and a relative grant (RG) for controlling a relative value of the transmission rate.

The absolute grant (AG) is data (Index) directly specifying the transmission power ratio (E-DPDCH/DPCCH) to be assigned to the radio terminal 10 (see 3GPP TS25.212 Ver.7.5.0 4.10.1A.1 "Information field mapping of the Absolute Grant Value").

As described above, the absolute grant (AG) is a command directly specifying the transmission rate value without relying on the current transmission rate.

The relative grant (RG) is data ("Up", "Down" and "Hold") relatively specifying the transmission power ratio (E-DPDCH/DPCCH) assigned to the radio terminal 10 (see 3GPP TS25.321 Ver. 7.5.0 9.2.5.2.1 "Relative Grants").

As described above, the relative grant (RG) is a command relatively controlling the current transmission rate. Specifically, the relative grant (RG) includes an increase command "Up" for instructing an increase of the current transmission rate, a retention command "Hold" for instructing a retention of the current transmission rate, and a decrease command "Down" for instructing a decrease of the current transmission rate. Here, the increase command instructs the increase of the transmission rate by a predetermined amount. Further, the decrease command instructs the decrease of the transmission rate by a predetermined amount. The predetermined amount for the increase may be the same as or smaller than the predetermined amount for the decrease.

The base station 100a transmits the absolute grant (AG) to the radio terminal 10 via the E-DCH absolute grant channel (E-AGCH). The base station 100a transmits the relative grant (RG) to the radio terminal 10 via the E-DCH relative grant channel (E-RGCH).

For example, the serving cell (here, the cell A) transmits the AG to the radio terminal 10 via the E-AGCH and transmits the RG to the radio terminal 10 via the E-RGCH. Meanwhile, the non-serving cell (here, the cell B) transmits the RG to the radio terminal 10 via the E-RGCH without transmitting the AG to the radio terminal 10 via the E-AGCH.

It should be note that, in FIG. 1, the channels (the DPDCH, the DPCCH and the like) used in the R99 are merely omitted for simplifying the description. It should also be noted that multiple number of the radio terminals 10 existed in each of the cells are omitted in the description.

Further, the cell used as the serving cell by the radio terminal 10 is not limited to one cell but may be more than one cell.

Here, it should be noted that, in the EUL, the transmission rate assigned to the radio terminal 10 can be controlled for each TTI by the transmission rate control data (AG or RG). Meanwhile, in the R99, the transmission rate assigned to the radio terminal 10 can be controlled only by a period longer than one TTI.

(Configuration of Base Station)

Figure 3:
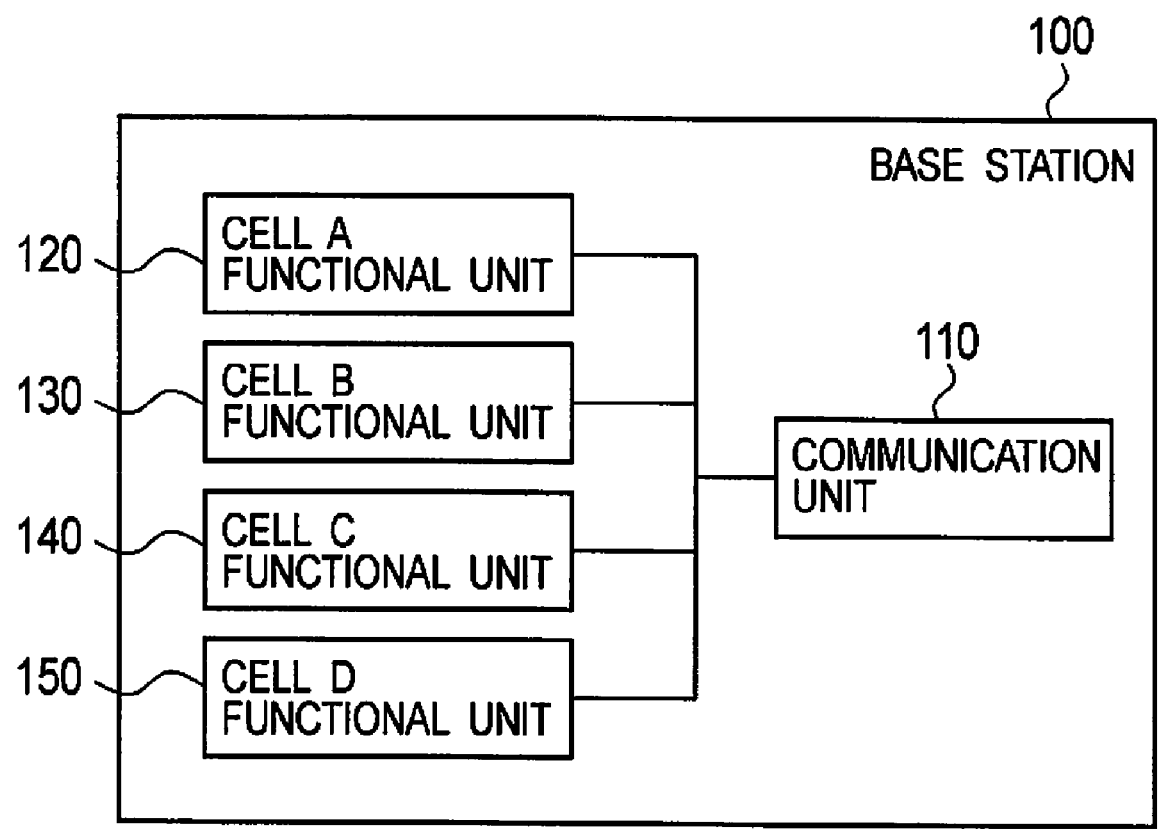
FIG. 3 is a block diagram showing a base station 100 according to the first embodiment.

With reference to the accompanying drawings, description will be given of a configuration of the base station according to the first embodiment. FIG. 3 is a block diagram showing the base station 100 according to the first embodiment.

As shown in FIG. 3, the base station 100 includes a communication unit 110, a cell A functional unit 120, a cell B functional unit 130, a cell C functional unit 140 and a cell D functional unit 150.

The communication unit 110 communicates with the radio terminal 10 located in the cells A to D. Here, the plurality of the radio terminals 10 is located in the cells A to D, respectively. Specifically, the communication unit 110 receives uplink user data from each of the plurality of radio terminals 10 via the data channel such as the DPDCH or the E-DPDCH. Further, the communication unit 110 receives uplink control data from each of the plurality of radio terminals 10 via the control channel such as the DPCCH or the E-DPCCH. Meanwhile, the communication unit 110 transmits transmission rate control data (such as AG RG, or the like) to each of the plurality of radio terminals 10 via the control channel such as the E-AGCH and the E-RGCH.

Note that the communication unit 110 also communicates with upper apparatuses (such as a radio network controller, a switching apparatus or the like), which controls the base station 100.

The cell A functional unit 120 functions as a serving cell for radio terminals 10 located in the cell A. Meanwhile, the cell A functional unit 120 functions as a non-serving cell for radio terminals 10 located in the cells B to D.

The cell B functional unit 130 functions as a serving cell for radio terminals 10 located in the cell B. Meanwhile, the cell B functional unit 130 functions as a non-serving cell for radio terminals 10 located in the cells A, C and D.

The cell C functional unit 140 functions as a serving cell for radio terminals 10 located in the cell C. Meanwhile, the cell C functional unit 140 functions as a non-serving cell for radio terminals 10 located in the cells A, B and D.

The cell D functional unit 150 functions as a serving cell for radio terminals 10 located in the cell D. Meanwhile, the cell D functional unit 150 functions as a non-serving cell for radio terminals 10 located in the cells A to C.

(Configuration of Cell)

Figure 4:
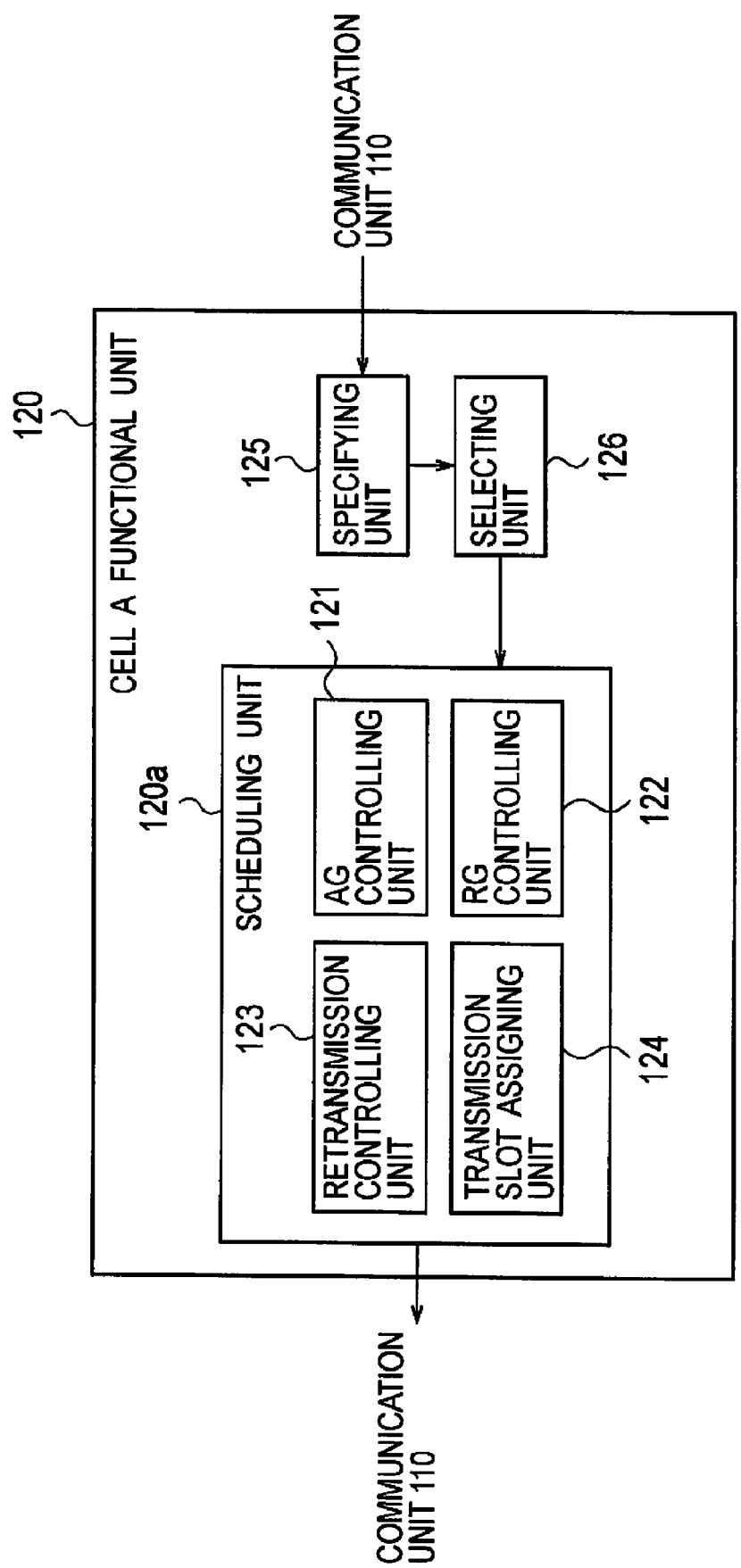
FIG. 4 is a block diagram showing a cell A functional unit 120 according to the first embodiment.

With reference to the accompanying drawings, description will be given of a configuration of the cell according to the first embodiment. FIG. 4 is a block diagram showing the cell (the cell A functional unit 120) according to the first embodiment. Here, description will be given for an example in which the cell A functional unit 120 functions as a serving cell.

As shown in FIG. 4, the cell A functional unit 120 includes: a scheduling unit 120a, a specifying unit 125, and a selecting unit 126.

The scheduling unit 120a includes an AG controlling unit 121, an RG controlling unit 122, a retransmission controlling unit 123 and a transmission slot assigning unit 124. The scheduling unit 120a is operated in a MAC-e (Media Access Control Enhanced) layer.

The AG controlling unit 121 transmits an AG via the E-AGCH to the radio terminal 10. Note that the AG is a command for directly specifying a value of the transmission rate without relying on the current transmission rate.

The RG controlling unit 122 transmits an RG via the E-RGCH to the radio terminal 10 (serving radio terminal of the cell A). Note that the RG includes the increase command "Up" for instructing the increase of the current transmission rate, the retention command "Hold" for instructing the retention of the current transmission rate, and the decrease command "Down" for instructing the decrease of the current transmission rate. As described above, the increase command "Up" instructs the increase of the transmission rate by a predetermined amount and the decrease command "Down" instructs the decrease by a predetermined amount. The predetermined amount for the increase may be the same as or smaller than the predetermined amount for the decrease.

Note that, the AG controlling unit 121 and the RG controlling unit 122 control the SG to be assigned to the radio terminal 10, by referring to the uplink control data and the like received from the radio terminal 10.

The retransmission controlling unit 123 determines, for each block (for each process), whether or not an error is occurred in the uplink user data. Thereafter, the retransmission controlling unit 123 requests the radio terminal 10 to retransmit a block in which an error is occurred (hereinafter referred to as an error block). Here, a retransmission control technique is a HARQ (Hybrid Automatic Repeat Request) technique for combining a block firstly transmitted from the radio terminal 10 (hereinafter referred to as a transmission block) with a block retransmitted from the radio terminal 10 (hereinafter referred to as a retransmission block).

The transmission slot assigning unit 124 assigns, to the radio terminal 10, a transmission slot (that is, a process included in one TTI) to be used for transmitting the uplink user data (block) via the E-DPDCH. Note that the radio terminal 10 transmits the transmission block or the retransmission block to the base station 100 by using the process (active process) assigned by the transmission slot assigning unit 124.

A specifying unit 125 specifies a decrease target time interval (decrease target TTI) that indicates a transmission time interval (TTI) in which the sum of the already assigned transmission rates is larger than an allowable receiving transmission rate.

Here, the already assigned transmission rates include a transmission rate assigned to the radio terminal 10 that performs communications in the R99, and a transmission rate assigned to the radio terminal 10 that performs communications in the EUL.

The allowable receiving transmission rate indicates a transmission rate not larger than a maximum receiving transmission rate. Note that the allowable receiving transmission rate may be previously determined or may be changed according to the usage status of the radio resources. The maximum receiving transmission rate is an upper limit of transmission rates that can be assigned to the radio terminal 10 by the base station 100 (here, the cell A). In other words, the maximum receiving transmission rate may be considered as an upper limit of radio resources (maximum radio resources) that can be assigned to the radio terminal 10.

Note that, a difference between the maximum receiving transmission rate and the allowable receiving transmission rate indicates a margin (reserved resources) of the transmission rate (radio resources) that can be assigned by the base station 100 (cell).

A selecting unit 126 selects the radio terminal 10 (decrease target radio terminal) whose transmission rate should be decreased in the decrease target TTI. For example, description will be given of a method for selecting the decrease target radio terminal by the selecting unit 126 in the following two cases.

(1) Case 1

In Case 1, the selecting unit 126 selects, as the decrease target radio terminal, the radio terminal 10 to which a transmission rate higher than a minimum transmission rate is assigned. Note that the minimum transmission rate is the lowest transmission rate that should be assigned to the radio terminal 10.

Note that, as will be described later, the scheduling unit 120*a* transmits, to the decrease target radio terminal selected in Case 1, an AG (minimum transmission rate) for specifying the minimum transmission rate.

(2) Case 2

In Case 2, the selecting unit 126 selects, as the decrease target radio terminal, the radio terminal 10 to which a plurality of active processes is assigned in the cyclic period.

Note that, as will be described later, the scheduling unit 120*a* transmits, to the decrease target radio terminal selected in Case 2, an AG (Inactive) for instructing the decrease target radio terminal to suspend using the active processes assigned to the decrease target radio terminal in the decrease target TTI.

Here, the selecting unit 126 may preferentially select, as the decrease target radio terminal, the radio terminal 10 having a lower priority class, from among the radio terminals 10 selected in the above-described Cases 1 and 2. Note that the priority class is previously assigned to the radio terminal 10. Moreover, the selecting unit 126 may select, as the decrease target radio terminal, the radio terminal 10 randomly selected from the radio terminals 10 selected in Cases 1 and 2.

The scheduling unit 120*a* described above transmits, to the radio terminal 10 (decrease target radio terminal) selected by the selecting unit 126, transmission rate control data (transmission rate decrease data) for instructing a decrease of the SG.

For example, the AG controlling unit 121 transmits, to the radio terminal 10 selected in Case 1, as the transmission rate decrease data, an AG (minimum transmission rate) for specifying the minimum transmission rate. The AG controlling unit 121 transmits, to the radio terminal 10 selected in Case 2, as the transmission rate decrease data, an AG (Inactive) for instructing the selected radio terminal 10 to suspend using the active processes assigned thereto in the decrease target TTI.

Note that the RG controlling unit 122 may transmit, to the radio terminal 10, as the transmission rate decrease data, an RG (decrease command "Down") for instructing a decrease of the SG (Example of Transmission Rate Control)

Figure 5:
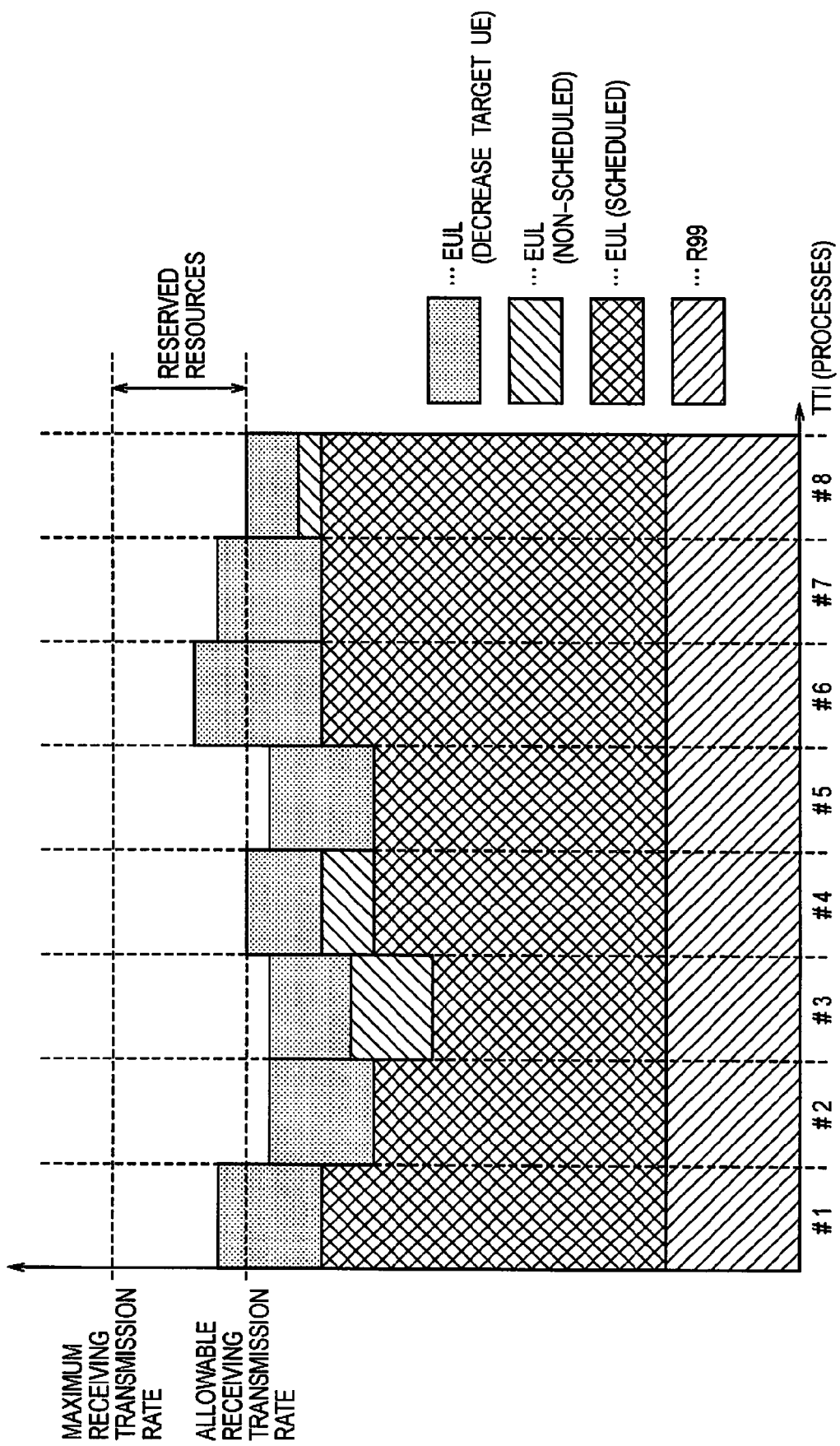
FIG. 5 is a view for explaining an example of transmission rate control according to the first embodiment.

An example of transmission rate control according to the first embodiment will be described below. FIG. 5 is a view for explaining the example of transmission rate control according to the first embodiment.

As shown in FIG. 5, a plurality of TTIs (TTI #1 to TTI #8) forms a cyclic period. The cyclic period is repeated in the transmission of the uplink user data.

Here, in the TTIs #1, #6 and #7, the sum of already assigned transmission rates is larger than an allowable receiving transmission rate. In other words, the TTIs #1, #6 and #7 are decrease target TTIs.

Here, the assigned transmission rates include a transmission rate (R99) assigned in the R99 and a transmission rate (EUL) assigned in the EUL. Note that the transmission rate (R99) does not have to be assigned. The transmission rate (EUL) assigned in the EUL includes a transmission rate (EUL (Scheduled)) assigned for scheduled transmission, and a transmission rate (EUL (Non-Scheduled)) assigned for non-scheduled transmission. Note that the transmission rate (EUL (Non-Scheduled)) does not have to be assigned.

The scheduled transmission is a transmission mode in which the radio terminal 10 transmits the uplink user data by use of the active processes assigned by the base station 100. The non-scheduled transmission is a transmission mode in which the radio terminal 10 transmits the uplink user data without relying on the scheduling control performed by the base station 100.

Here, the transmission rate (EUL) assigned in the EUL includes a transmission rate (EUL (decrease target UE)) assigned to the radio terminal 10 (decrease target radio terminal) selected in the above Case 1 or Case 2. Note that the transmission rate (EUL (decrease target UE)) is normally included in the transmission rate (EUL (Scheduled)). Specifically, in FIG. 5, the transmission rate (EUL (decrease target UE)) and the transmission rate (EUL (Scheduled)) are separately shown only to clarify the explanation.

In the TTIs #1, #6 and #7, the base station 100 transmits the transmission rate decrease data (AG or RG) to the decrease target radio terminal, in order to decrease the transmission rate (EUL (decrease target UE)).

(Operations of Base Station (Cell))

Figure 6:
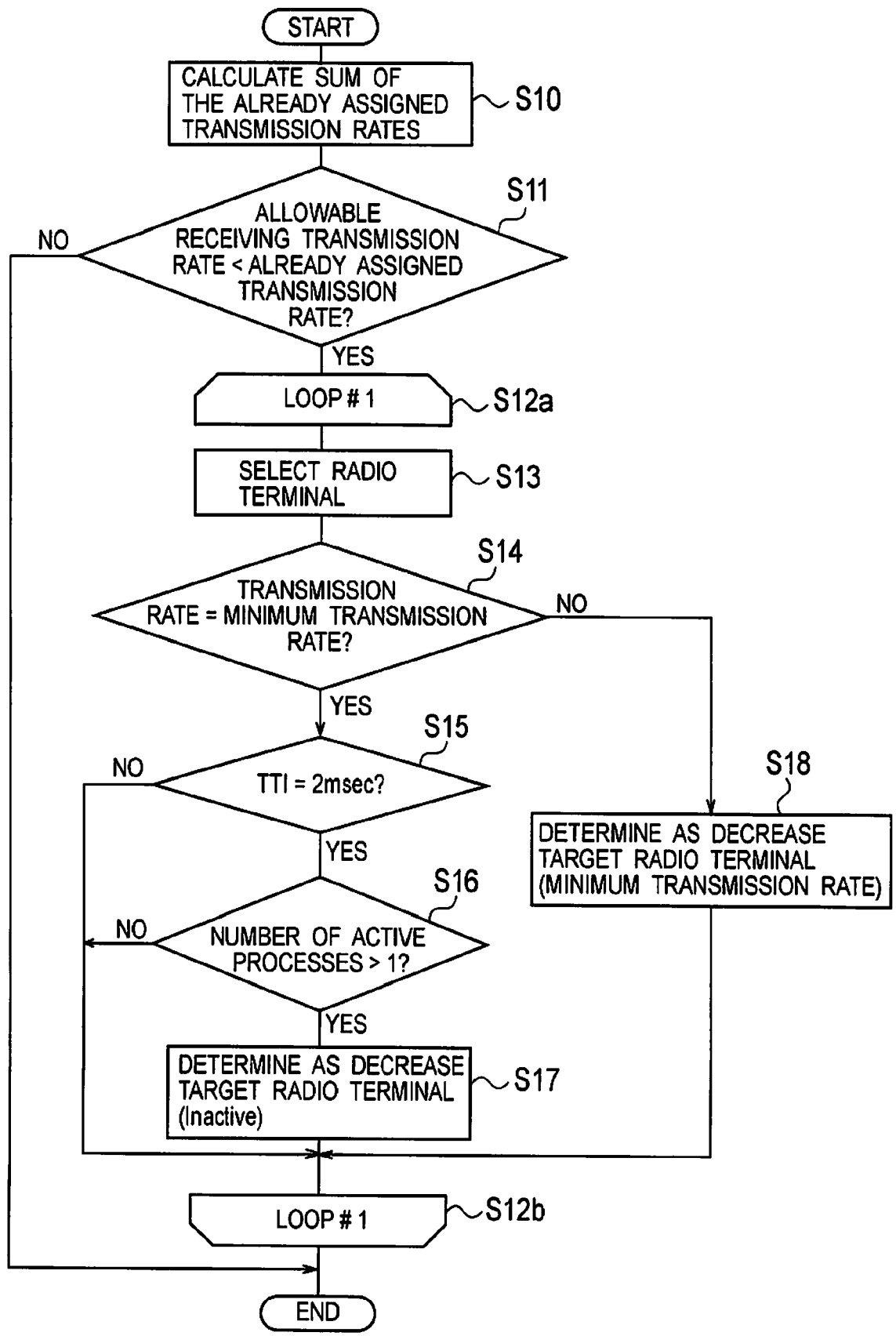
FIG. 6 is a flowchart showing operations of the base station 100 (cell) according to the first embodiment.

With reference to the drawing, description will be given below of operations of the base station (cell) according to the first embodiment. FIG. 6 is a flowchart showing operations of the base station 100 (cell) according to the first embodiment.

As shown in FIG. 6, in Step 10, the base station 100 calculates a sum of already assigned transmission rates. To be more specific, as shown in FIG. 5, the base station 100 calculates a sum of transmission rates assigned in each TTI.

In Step 11, the base station 100 determines whether or not the sum of the already assigned transmission rates is larger than an allowable receiving transmission rate in a TTI (check target TTI) to be checked. When the sum of the already assigned transmission rates is larger than the allowable receiving transmission rate, the base station 100 moves to the loop processing of Step 12*a* to Step 12*b*. On the other hand, when the sum of the already assigned transmission rates is not larger than the allowable receiving transmission rate, the base station 100 terminates a series of processing.

In the processing from Step 12*a* to Step 12*b*, the base station 100 (cell) repeats the loop processing. Note that the base station 100 (cell) repeats the loop processing until the base station completes checking of all the radio terminals 10 (serving terminal) that use the own base station (own cell) as a serving cell. In other words, a termination condition for the loop processing is to finish checking of all the radio terminals 10 sharing the check target TTI.

In Step 13, the base station 100 selects the radio terminal 10 to which processes in the check target TTI (decrease target TTI) is assigned. Here, the base station 100 may select the radio terminal 10 in ascending order of priority class or may randomly select the radio terminal 10. Note that, as a matter of course, the radio terminals 10 selected in the respective loop processings do not overlap with each other.

In Step 14, the base station 100 determines whether or not the transmission rate assigned to the radio terminal 10 selected in Step 13 is a minimum transmission rate. When the transmission rate is the minimum transmission rate, the base station 100 moves to processing of Step 15. Meanwhile, when the transmission rate is higher than the minimum transmission rate, the base station 100 moves to processing of Step 18.

In Step 15, the base station 100 determines whether or not the process assigned to the radio terminal 10 selected in Step 13 is a 2 msec TTI. When the assigned process is a 2 msec TTI, the base station 100 moves to processing of Step 16. Meanwhile, when the assigned process is not a 2 msec TTI, that is, when the assigned process is a 10 msec TTI, the base station 100 moves to processing of Step 12b. To be more specific, the base station 100 moves to the next loop processing or terminates a series of processing.

In Step 16, the base station 100 determines whether or not the number of active processes assigned to the radio terminal 10 in the cyclic period is not less than 2. When the number of the active processes in the cyclic period is not less than 2, the base station 100 moves to processing of Step 17. On the other hand, when the number of the active processes is less than 2, the base station 100 moves to processing of Step 12b. To be more specific, the base station 100 moves to the next loop processing or terminates a series of processing.

In Step 17, the base station 100 determines the radio terminal 10 selected in Step 13 as the decrease target radio terminal. Here, the base station 100 transmits, to the radio terminal 10 determined as the decrease target radio terminal in Step 17, an AG (Inactive) for instructing the decrease target radio terminal to suspend using the active processes.

In Step 18, the base station 100 determines the radio terminal 10 selected in Step 13 as the decrease target radio terminal. Here, the base station 100 transmits, to the radio terminal 10 determined as the decrease target radio terminal in Step 18, an AG (minimum transmission rate) for specifying the minimum transmission rate.

(Operations and Effects)

In the first embodiment, the specifying unit 125 specifies the decrease target TTI in which the sum of the already assigned transmission rates is larger than the allowable receiving transmission rate. Moreover, the scheduling unit 120a transmits the transmission rate decrease data (AG or RG) to the radio terminal 10 (decrease target radio terminal) assigned the processes in the decrease target TTI.

Specifically, in the TTI in which a decrease of the assigned transmission rate is required, the transmission rate decrease data is transmitted. On the other hand, in the TTI in which a decrease of the assigned transmission rate is not required, the transmission rate decrease data is not transmitted.

Therefore, the reception quality of the uplink user data can be prevented from being deteriorated and the radio resources (transmission rate) to be assigned to the radio terminal 10 can be effectively utilized.

For example, in the above Case 1, the base station 100 selects, as the decrease target radio terminal, the radio terminal 10 having the transmission rate higher than the minimum transmission rate. Thereafter, the base station 100 transmits, to the decrease target radio terminal, the AG (minimum transmission rate) for specifying the minimum transmission rate.

Therefore, the reception quality of the uplink user data can be prevented from being deteriorated while an opportunity for the decrease target radio terminal to transmit the uplink user data is maintained.

For example, in the above Case 2, the base station 100 selects, as the decrease target radio terminal, the radio terminal 10 to which not less than 2 active processes are assigned in the cyclic period. Thereafter, the base station 100 transmits, to the decrease target radio terminal, the AG (Inactive) for instructing the decrease target radio terminal to suspend using the active processes.

Therefore, the reception quality of the uplink user data can be prevented from being deteriorated while an opportunity for the decrease target radio terminal to transmit the uplink user data is maintained.

Second Embodiment

With reference to the accompanying drawing, a second embodiment will be described below. The following description is mainly given of differences between the first embodiment described above and the second embodiment.

Specifically, in the first embodiment described above, the base station 100 transmits the AG (minimum transmission rate) or the AG (Inactive) to the decrease target radio terminal (see the above Case 1 or Case 2).

Meanwhile, in the second embodiment, a base station 100 transmits the AG (Inactive) to a decrease target radio terminal, without transmitting the AG (minimum transmission rate).

(Operations of Base Station (Cell))

Figure 7:
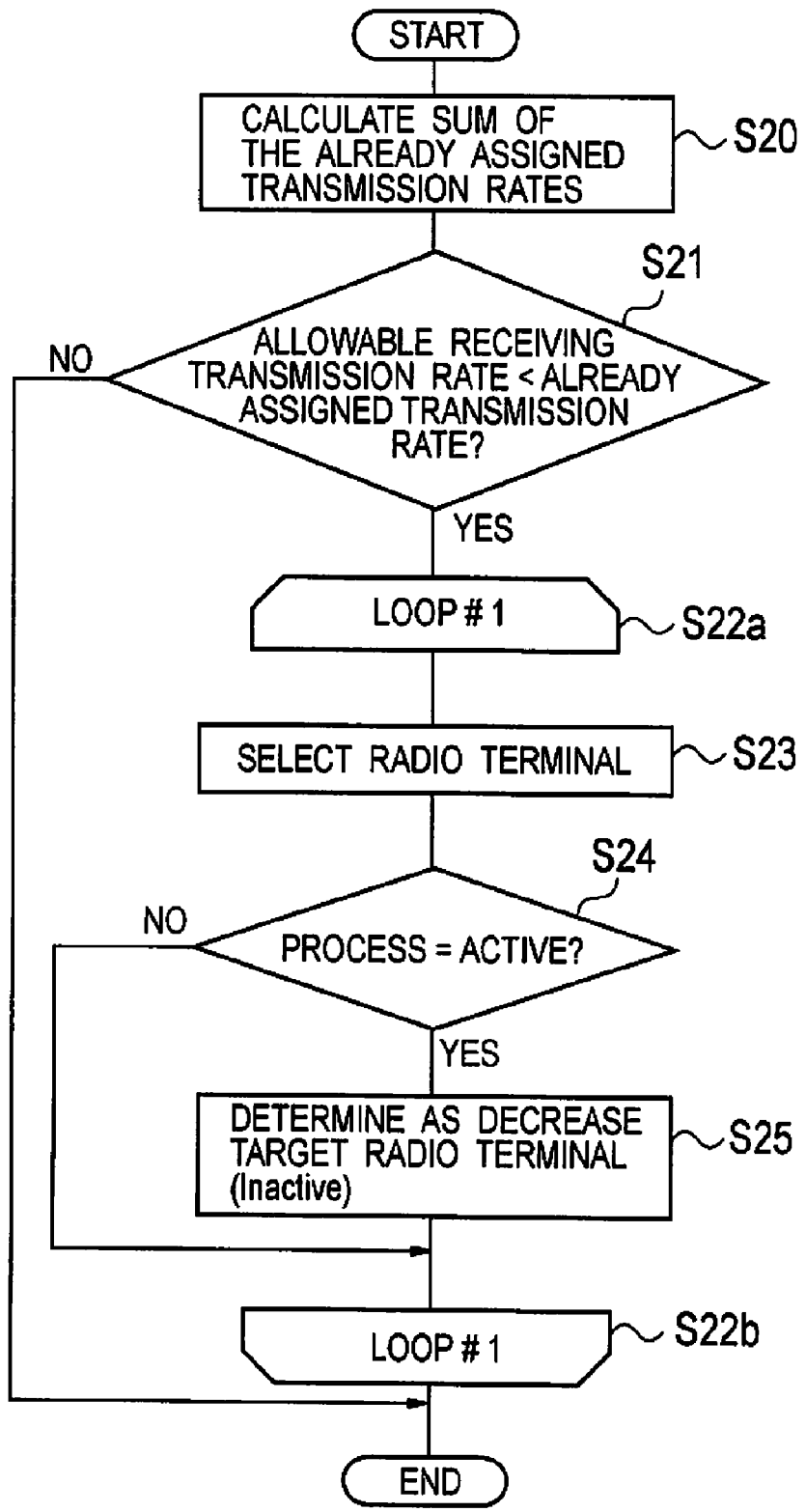
FIG. 7 is a flowchart showing operations of a base station 100 (cell) according to a second embodiment.

With reference to the drawing, description will be given below of operations of the base station (cell) according to the second embodiment. FIG. 7 is a flowchart showing operations of the base station 100 (cell) according to the second embodiment.

As shown in FIG. 7, in Step 20, the base station 100 calculates a sum of already assigned transmission rates. To be more specific, as shown in FIG. 5, the base station 100 calculates a sum of transmission rates assigned in each TTI.

In Step 21, the base station 100 determines whether or not the sum of the already assigned transmission rates is larger than an allowable receiving transmission rate in a TTI (check target TTI) to be checked. When the sum of the already assigned transmission rates is larger than the allowable receiving transmission rate, the base station 100 moves to the loop processing from Step 22a to Step 22b. On the other hand, when the sum of the already assigned transmission rates is not larger than the allowable receiving transmission rate, the base station 100 terminates a series of processing.

In the processing from Step 22a to Step 22b, the base station 100 (cell) repeats the loop processing. Note that the base station 100 (cell) repeats the loop processing until the base station completes checking of all the radio terminals 10 (serving terminal) that use the own base station (own cell) as a serving cell. In other words, a termination condition for the loop processing is to finish checking of all the radio terminals 10 sharing the check target TTI.

In Step 23, the base station 100 selects the radio terminal 10 to which processes in the check target TTI is assigned. Here, the base station 100 selects the radio terminal 10 in the following manner (1) to (4).

(1) The base station 100 preferentially selects the radio terminal 10 having a high transmission rate. In other words, the radio terminal 10 having the high transmission rate is more likely to be selected as the decrease target radio terminal than the radio terminal 10 having a low transmission rate.

(2) The base station 100 preferentially selects the radio terminal 10 to which more active processes are assigned in the cyclic period. In other words, the radio terminal 10 to which more active processes are assigned is more likely to be selected as the decrease target radio terminal than the radio terminal 10 to which less active processes are assigned.

(3) The base station 100 preferentially selects the radio terminal 10 having a low priority class. In other words, the radio terminal 10 having the low priority class is more likely to be selected as the decrease target radio terminal than the radio terminal 10 having a high priority class.

(4) The base station 100 randomly selects the radio terminal 10.

In Step 24, the base station 100 determines whether or not the processes assigned to the radio terminal 10 selected in Step 23 are active processes. When the processes assigned to the radio terminal 10 are the active processes, the base station 100 moves to processing of Step 25. Meanwhile, when the processes are not the active processes, for example, when the use of the processes is suspended by a transmission of the AG (Inactive), the base station 100 moves to processing of Step 22b. To be more specific, the base station 100 moves to the next loop processing or terminates a series of processing.

In Step 25, the base station 100 determines, as the decrease target radio terminal, the radio terminal 10 selected in Step 23. Note that the base station 100 transmits, to the radio terminal 10 determined as the decrease target radio terminal, an AG (Inactive) for instructing the decrease target radio terminal to suspend using the active processes.

(Operations and Effects)

According to the second embodiment, as in the case of the first embodiment, the reception quality of the uplink user data can be prevented from being deteriorated and the radio resources (transmission rate) to be assigned to the radio terminal 10 can be effectively utilized.

For example, the base station 100 preferentially selects the radio terminal 10 having a high transmission rate as the decrease target radio terminal. Therefore, the reception quality of the uplink user data can be prevented from being deteriorated while an opportunity for the decrease target radio terminal to transmit the uplink user data is maintained.

The base station 100 preferentially selects, as the decrease target radio terminal, the radio terminal 10 to which more active processes are assigned. Therefore, the reception quality of the uplink user data can be prevented from being deteriorated while an opportunity for the decrease target radio terminal to transmit the uplink user data is maintained.

The base station 100 preferentially selects the radio terminal 10 having a low priority class as the decrease target radio terminal. Therefore, the reception quality of the uplink user data can be prevented from being deteriorated while adverse effects caused by a decrease of the assigned transmission rate are reduced.

Other Embodiments

The present invention has been described by use of the embodiments described above. However, it should be understood that the present invention is not limited to the description and drawings that constitute a part of this disclosure. From this disclosure, various alternative embodiments, examples and operational techniques will be apparent to those skilled in the art.

Although the embodiments described above has not particularly described, the base station 100 may select the decrease target radio terminal in accordance with the sum of transmission rates (transmission rate×number of active processes) assigned to the radio terminal 10 in the cyclic period.

What is claimed is:

1. A radio communication system in which a radio terminal transmits uplink user data to a base station via an enhanced dedicated physical data channel in a transmission time interval assigned to the radio terminal, and in which the base station transmits, to the radio terminal, transmission rate control data for controlling a transmission rate of the uplink user data, wherein the base station comprises:
a specifying unit configured to specify a decrease target transmission time interval that indicates the transmission time interval in which a sum of already assigned transmission rates is larger than an allowable receiving transmission rate;
a selecting unit configured to select, as a decrease target radio terminal, the radio terminal to which the transmission time interval in the decrease target transmission time interval is assigned; and
a transmitting unit configured to transmit, to the decrease target radio terminal, transmission rate decrease data that is the transmission rate control data for instructing a decrease of the transmission rate, and
the allowable receiving transmission rate is not larger than a maximum receiving transmission rate that can be assigned by the base station.

2. The radio communication system according to claim 1, wherein
the base station transmits, to the radio terminal, as the transmission rate control data, an absolute transmission rate control data for directly specifying the transmission rate, and
the transmitting unit transmits, to the decrease target radio terminal, as the transmission rate decrease data, the absolute transmission rate control data for specifying a minimum transmission rate that indicates a minimum transmission rate to be assigned to the radio terminal.

3. The radio communication system according to claim 1, wherein
the base station transmits, to the radio terminal, as the transmission rate control data, an absolute transmission rate control data for directly specifying the transmission rate, and
the transmitting unit transmits, to the decrease target radio terminal, as the transmission rate decrease data, the absolute transmission rate control data for instructing the decrease target radio terminal to suspend using the transmission time interval in the decrease target transmission time interval.

4. The radio communication system according to claim 1, wherein
the selecting unit preferentially selects, as the decrease target radio terminal, the radio terminal having a high transmission rate.

5. The radio communication system according to claim 1, wherein
a predetermined number of transmission time intervals forms a cyclic period and the cyclic period is repeated, and
the selecting unit preferentially selects, as the decrease target radio terminal, the radio terminal to which the large number of the transmission time intervals are assigned in the cyclic period.

6. The radio communication system according to claim 1, wherein
the radio terminal has a priority class that is previously assigned, and
the selecting unit preferentially selects, as the decrease target radio terminal, the radio terminal having a low priority class.

7. A radio communication method in which a radio terminal transmits uplink user data to a base station via an enhanced dedicated physical data channel in a transmission time interval assigned to the radio terminal, and in which the base station transmits, to the radio terminal, transmission rate control data for controlling a transmission rate of the uplink user data, the method comprising:

specifying, at the base station, a decrease target transmission time interval that indicates the transmission time interval in which a sum of already assigned transmission rates is larger than an allowable receiving transmission rate;

selecting, at the base station, as a decrease target radio terminal, the radio terminal to which the transmission time interval in the decrease target transmission time interval is assigned; and transmitting, from the base station to the decrease target radio terminal, transmission rate decrease data that is the transmission rate control data for instructing a decrease of the transmission rate, wherein the allowable receiving transmission rate is not larger than a maximum receiving transmission rate that can be assigned by the base station.

8. A base station configured to receive uplink user data from a radio terminal via an enhanced dedicated physical data channel, at a transmission time interval assigned to the radio terminal, and to transmit, to the radio terminal, transmission rate control data for controlling a transmission rate of the uplink user data, the base station comprising:

a specifying unit configured to specify a decrease target transmission time interval that indicates the transmission time interval in which a sum of already assigned transmission rate is larger than an allowable receiving transmission rate;

a selecting unit configured to select, as a decrease target radio terminal, the radio terminal to which the transmission time interval in the decrease target transmission time interval is assigned; and a transmitting unit configured to transmit, to the decrease target radio terminal, transmission rate decrease data that is the transmission rate control data for instructing a decrease of the transmission rate, wherein the allowable receiving transmission rate is not larger than a maximum receiving transmission rate that can be assigned by the base station.

* * * * *